United States Patent
Cho et al.

(10) Patent No.: US 10,044,413 B2
(45) Date of Patent: Aug. 7, 2018

(54) RADIO-FREQUENCY COMMUNICATION DEVICE HAVING A NEAR FIELD COMMUNICATION FUNCTION, AND METHOD OF OPERATING THE SAME

(71) Applicant: SAMSUNG ELECTRONICS CO., LTD., Suwon-si, Gyeonggi-Do (KR)

(72) Inventors: Jongpil Cho, Hwaseong-si (KR); Junesoo Kim, Daegu (KR); Youngjoo Lee, Yongin-si (KR)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 138 days.

(21) Appl. No.: 15/269,126

(22) Filed: Sep. 19, 2016

(65) Prior Publication Data
US 2017/0085298 A1    Mar. 23, 2017

(30) Foreign Application Priority Data
Sep. 21, 2015 (KR) .................. 10-2015-0133117

(51) Int. Cl.
*G08C 17/02* (2006.01)
*H04B 5/00* (2006.01)
*G06K 7/10* (2006.01)

(52) U.S. Cl.
CPC ....... *H04B 5/0062* (2013.01); *G06K 7/10237* (2013.01); *G08C 17/02* (2013.01); *H04B 5/0025* (2013.01); *G06K 7/10297* (2013.01)

(58) Field of Classification Search
CPC ............. G08C 17/02; G06K 7/10237; G06K 7/10297; H04B 5/0062; H04B 5/0025
See application file for complete search history.

(56) References Cited

U.S. PATENT DOCUMENTS

| 8,188,787 B2 | 5/2012 | Wilson et al. |
| 8,432,258 B2* | 4/2013 | Wilkinson ........... G06K 7/0008 340/10.4 |
| 9,634,727 B2* | 4/2017 | Ozenne ................ H04B 5/0031 |
| 2009/0040022 A1* | 2/2009 | Finkenzeller ........ G06K 7/0008 340/10.1 |
| 2011/0230138 A1 | 9/2011 | Ohkita |

(Continued)

FOREIGN PATENT DOCUMENTS

| JP | H11232418 | 8/1999 |
| JP | 2006268359 | 10/2006 |

(Continued)

*Primary Examiner* — Thomas Alunkal
(74) *Attorney, Agent, or Firm* — F. Chau & Associates, LLC

(57) ABSTRACT

A radio-frequency (RF) communication device having a near field communication (NFC) function includes a first detection mode circuit configured to output an RF input signal received by an antenna as a first RF signal while the first detection mode circuit is enabled, and a second detection mode circuit configured to amplify the RF input signal and output the amplified RF input signal as a second RF signal while the second detection mode circuit is enabled. The first detection mode circuit is enabled during a first time period, and the second detection mode circuit is enabled during a second time period. The second time period is shorter than the first time period. The first and second detection mode circuits are enabled alternately and repeatedly.

20 Claims, 7 Drawing Sheets

(56) References Cited

U.S. PATENT DOCUMENTS

| | | | | |
|---|---|---|---|---|
| 2011/0250839 A1* | 10/2011 | Lee | ..................... | H04M 1/7253 |
| | | | | 455/41.1 |
| 2013/0203355 A1* | 8/2013 | Ootani | ............... | G06K 19/0726 |
| | | | | 455/41.2 |
| 2014/0022143 A1* | 1/2014 | Tramoni | .............. | H04B 5/0043 |
| | | | | 343/861 |
| 2014/0127993 A1 | 5/2014 | Frankland | | |
| 2014/0187176 A1 | 7/2014 | Sato | | |
| 2014/0246493 A1* | 9/2014 | Agrawal | ............ | G06K 7/10237 |
| | | | | 235/439 |
| 2015/0044964 A1* | 2/2015 | Khan | ...................... | G06F 21/35 |
| | | | | 455/41.1 |
| 2015/0079903 A1* | 3/2015 | Song | ................... | G06K 7/10217 |
| | | | | 455/41.1 |
| 2015/0178525 A1 | 6/2015 | Lee et al. | | |

FOREIGN PATENT DOCUMENTS

| | | |
|---|---|---|
| JP | 2011232927 | 11/2011 |
| KR | 1020140110369 | 9/2014 |

* cited by examiner

RADIO-FREQUENCY COMMUNICATION DEVICE HAVING A NEAR FIELD COMMUNICATION FUNCTION, AND METHOD OF OPERATING THE SAME

CROSS-REFERENCE TO RELATED APPLICATIONS

This application claims priority under 35 USC § 119 to Korean Patent Application No. 10-2015-0133117, filed on Sep. 21, 2015, the disclosure of which is incorporated by reference herein in its entirety.

TECHNICAL FIELD

Exemplary embodiments of the present inventive concept relate to radio-frequency (RF) communication devices and, more particularly, to an RF communication device that performs a near field communication (NFC) function.

DISCUSSION OF THE RELATED ART

According to the operation principle of a radio-frequency identification (RFID) system, a reader may recognize and analyze information stored in a tag to obtain specific information on a tag-attached product.

Since an RFID system uses an RF signal, the RFID system is less affected by environmental variables such as, for example, snow, rain, wind, dust, and flux, and the recognition speed of the RFID system is high.

Near field communication technology is a type of RFID technology that uses a frequency band of about 13.56 MHz over a short distance of several meters or less to perform noncontact (e.g., wireless) data communication. An NFC system has improved security compared to other wireless communication systems because the communication distance of the NFC system is short. In addition, the cost for implementing an NFC system is low.

According to NFC technology standardized in ISO 18092, data may be transmitted and received between information devices. For example, information such as address book data, game data, audio data, etc. may be transmitted between, for example, handheld terminals and between a laptop computer and a handheld terminal.

A conventional NFC system may include an NFC reader circuit and an NFC card circuit. The NFC reader circuit reads and recognizes externally transmitted data, and the NFC card circuit provides internal specific information to an external reader to function as an NFC card (or tag) use in payment such as, for example, a transportation card or a credit card.

In a reader mode, which is also referred to as an active mode, the NFC reader circuit operates as an RFID reader and receives data through an antenna. In a card mode, which is also referred to as a passive mode, the NFC card circuit operates as an RFID tag.

SUMMARY

Exemplary embodiments of the present inventive concept relate to a radio-frequency (RF) communication device capable of detecting an RF signal at a long distance with low current and with low power consumption.

According to exemplary embodiments of the inventive concept, a radio-frequency (RF) communication device having a near field communication (NFC) function includes a first detection mode circuit configured to output an RF input signal received by an antenna as a first RF signal while the first detection mode circuit is enabled, and a second detection mode circuit configured to amplify the RF input signal and output the amplified RF input signal as a second RF signal while the second detection mode circuit is enabled. The first detection mode circuit is enabled during a first time period, and the second detection mode circuit is enabled during a second time period. The second time period is shorter than the first time period. The first and second detection mode circuits are enabled alternately and repeatedly.

According to exemplary embodiments of the inventive concept, a radio-frequency (RF) communication device includes a passive mode circuit configured to receive an RF signal from an external near field communication (NFC) reader, and output the received RF signal as a first RF signal while the passive mode circuit is enabled. The passive mode circuit is enabled during a first time period. The RF communication device further includes an amplified mode circuit configured to receive the RF signal from the external NFC reader, amplify the RF signal, and output the amplified RF signal as a second RF signal while the amplified mode circuit is enabled. The amplified mode circuit is enabled during a second time period, and the second time period is shorter than the first time period. The RF communication device further includes an RF detecting circuit configured to receive the first RF signal or the second RF signal, detect a voltage level, a voltage variation or a clock signal of the first RF signal or the second RF signal, and output a detection signal indicating whether the RF signal has been detected based on the detected voltage level, the detected voltage variation or the detected clock signal. The passive mode circuit and the amplified mode circuit are alternately activated.

According to exemplary embodiments of the inventive concept, a method of operating a radio-frequency (RF) communication device includes outputting, by a first detection mode circuit, an RF input signal received by an antenna as a first RF signal while the first detection mode circuit is enabled. The first detection mode circuit is enabled during a first time period. The method further includes amplifying, by a second detection mode circuit, the RF input signal while the second detection mode circuit is enabled. The method further includes outputting, by the second detection mode circuit, the amplified RF input signal as a second RF signal while the second detection mode circuit is enabled. The second detection mode circuit is enabled during a second time period, and the second time period is shorter than the first time period. The first and second detection mode circuits are enabled alternately and repeatedly.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION

Figure 1:
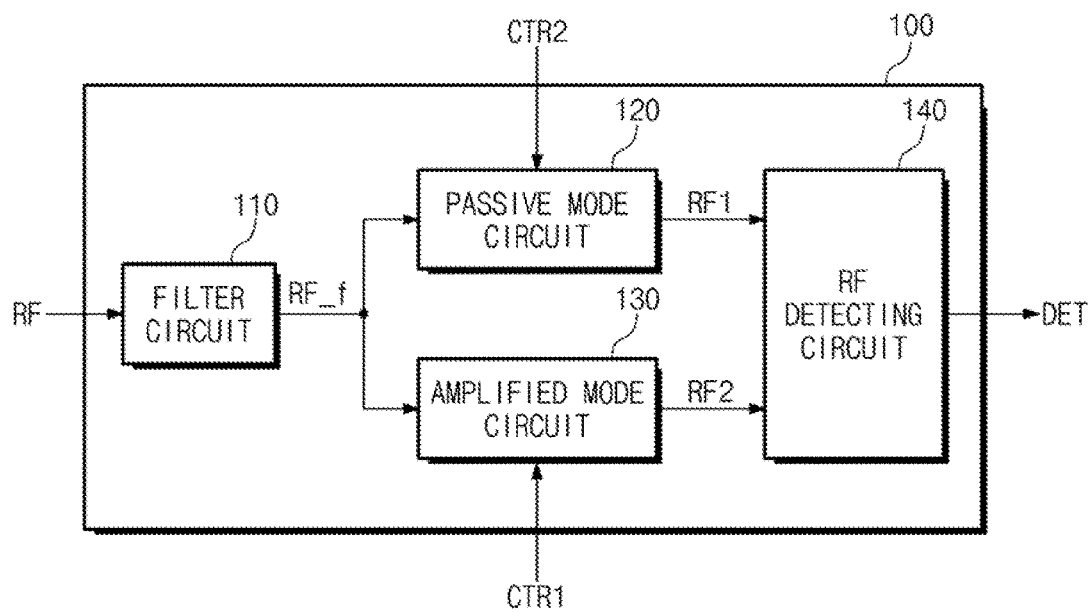
FIG. 1 is a block diagram of a radio-frequency (RF) detector according to exemplary embodiments of the inventive concept.

Exemplary embodiments of the present inventive concept will be described more fully hereinafter with reference to the accompanying drawings. In the drawings, the size and relative sizes of layers and regions may be exaggerated for clarity. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment. As used herein, the singular forms "a", "an" and "the" are intended to include the plural forms as well, unless the context indicates otherwise. Further, when processes or events are described as being performed at or occurring at substantially the same time, it is to be understood that the processes or events may be performed at or may occur at exactly the same time, or at about the same time as would be understood by a person having ordinary skill in the art.

FIG. 1 is a block diagram of a radio-frequency (RF) detector 100 according to exemplary embodiments of the inventive concept. As illustrated, the RF detector 100 in an exemplary embodiment includes a filter circuit 110, a passive mode circuit 120 (also referred to herein as a first detection mode circuit 120), an amplified mode circuit 130 (also referred to herein as a second detection mode circuit 130), and an RE detecting circuit 140. The RF detector 100 may detect an RF signal RF (also referred to herein as an RF input signal RF) received through an antenna, and may output a corresponding detection signal DET. The RF signal RF received through the antenna may be referred to herein as an RF input signal. The RF detector 100 may be configured as a portion of an RF unit of an RF communication device having a near field communication (NFC) function. In this case, the RF detector 100 may receive the RF signal RF from an external NFC reader to output the detection signal DET when the RF communication device operates in an NFC card mode. That is, the RF detector 100 may receive an RF input signal by an antenna via NFC.

In an exemplary embodiment, the filter circuit 110 passes only an RF signal of a specific frequency from among a plurality of RF signals received through the antenna. That is, the filter circuit 110 filters the RF signals received through the antenna such that only an RF signal(s) having a specific frequency is passed to the passive mode circuit 120 and the amplified mode circuit 130. The filter circuit 110 may be implemented with, for example, a bandpass filter. The filter circuit 110 may pass only, for example, RF signals having a frequency of about 13.56 MHz, which is the frequency utilized for NFC communication. When the RF communication device is a communication terminal such as, for example, a mobile phone, the RF communication device may have a wireless charging function and a magnetic secure transmission (MST) function. Thus, in exemplary embodiments, the filter circuit 110 does not react to an RF signal for wireless charging and an RF signal for MST, and passes only RF signals utilizing a desired frequency band (e.g., RF signals utilized for NFC communication). An RF signal RF_f filtered by the filter circuit 110 is output to the passive mode circuit 120 and the amplified mode circuit 130.

The passive mode circuit 120 outputs the input filtered RF signal RF_f as a first RF signal RF1 in response to a control signal CTR2. For example, the passive mode circuit 120 is periodically enabled to output the first RF signal RF1 for a set period of time in response to the control signal CTR2.

The amplified mode circuit 130 amplifies the input filtered RF signal RE_f to be output as a second RF signal RF2 in response to a control signal CTR1. For example, the amplified mode circuit 130 is periodically enabled to output the second RF signal RF2 for a set period of time in response to the control signal CTR1.

According to exemplary embodiments, the passive mode circuit 120 and the amplified mode circuit 130 are alternately enabled for a set period of time. The passive mode circuit 120 consumes a small amount of power, even when the passive mode circuit 120 is enabled, while the amplified mode circuit 130 consumes a relatively large amount of power to perform an amplify operation when the amplified mode circuit 130 is enabled. Accordingly, when the time during which the amplified mode circuit 130 is enabled is set to be shorter than the time during which the passive mode circuit 120 is enabled, the total power consumption may not significantly increase compared to an RF detector in which only the passive mode circuit 120 is used, and an RF signal may be detected from a further distance. A detailed configuration and operation of the passive mode circuit 120 and the amplified mode circuit 130 will be described with reference to FIGS. 2 and 3.

The RF detecting circuit 140 receives the first RF signal RF1 and the second RF signal RF2 to output a detection signal DET indicating whether the RF signal RF received from an antenna has been detected. For example, the existence of the RF signal RF may be determined according to a logic level (logic high or logic low). For example, in the exemplary embodiments described herein, when the detection signal DET is Logic high, the RF signal RF is determined to be detected and when the detection signal DET is logic low, the RF signal RF is determined to not be detected. However, the present inventive concept is not limited thereto. For example, in other exemplary embodiments, when the detection signal DET is logic low, the RF signal RF is determined to be detected, and when the detection signal DET is logic high, the RF signal RF is determined to not be detected. The detailed configuration and operation of the RF detecting circuit 140 according to exemplary embodiments will be described with reference to FIGS. 4 to 8.

The RF detector 100 described with reference to FIG. 1 according to exemplary embodiments periodically enables the amplified mode circuit 130 only for a limited period of time to increase the detection distance of an RF signal. In addition, the time during which the amplified mode circuit 130 is enabled is set to be shorter than the time during which the passive mode circuit 120 is enabled. Thus, according to exemplary embodiments, the total power consumption of the RF detector 100 may not significantly increase compared to an RF detector in which only the passive mode circuit 120 is used, and an RF signal may be detected from a further distance.

Figure 2:
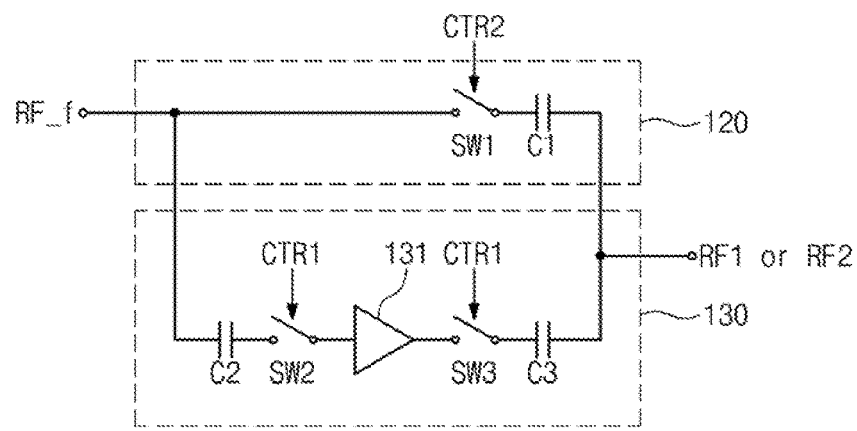
FIG. 2 illustrates the configuration of the passive mode circuit and the amplified mode circuit in FIG. 1 according to exemplary embodiments of the inventive concept.
Figure 3:
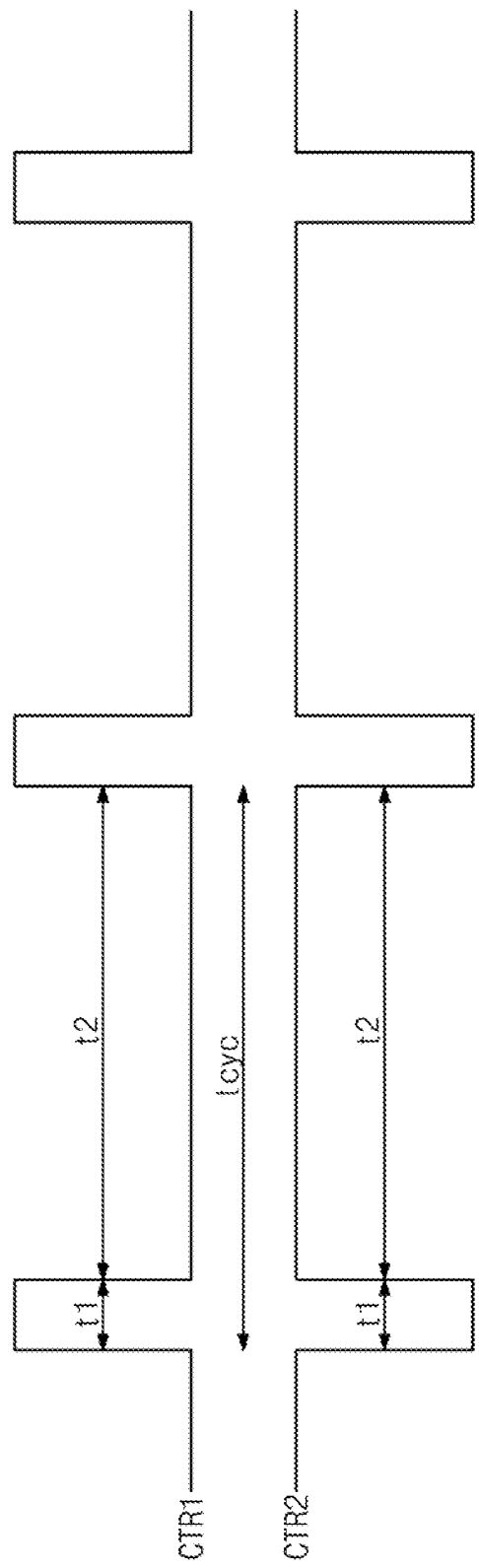
FIG. 3 is a timing diagram of control signals in FIG. 1 according to an exemplary embodiment of the inventive concept.

FIG. 2 illustrates the configuration of the passive mode circuit 120 and the amplified mode circuit 130 in FIG. 1 according to an exemplary embodiment of the inventive concept. FIG. 3 is a timing diagram of the control signals in FIG. 1 according to an exemplary embodiment of the inventive concept. The operations of the passive mode circuit 120 and the amplified mode circuit 130 will be described in detail with reference to FIGS. 2 and 3.

Referring to FIGS. 2 and 3, the passive mode circuit 120 includes a switch SW1 turned on or turned off in response to the control signal CTR2, and a capacitor C1 that removes a direct current (DC) element of the filtered RF signal RF_f.

The passive mode circuit 120 is repeatedly enabled in a set cycle tcyc for a second time period t2, which corresponds to a logic high period of the control signal CTR2. The passive mode circuit 120 is disabled for a first time period t1, which corresponds to a logic low period of the control signal CTR2. That is, the switch SW1 is turned on for the second time period t2 and turned off for the first time period t1 in response to the control signal CTR2. When the passive mode circuit 120 is enabled, the filtered RF signal RF_f, which is an output signal of the filter circuit 110, is output as a first RF signal RF1 through the capacitor C1 after the DC element is removed.

The amplified mode circuit 130 includes switches SW2 and SW3 turned on or turned off in response to the control signal CTR1, an amplifier 131 that amplifies the filtered RF signal RF_f, and capacitors C2 and C3 that remove a DC element of the filtered RF signal RF_f and an output signal of the amplifier 131, respectively.

Referring to FIG. 3, the amplified mode circuit 130 is repeatedly enabled in the set cycle tcyc for the first time period t1, which corresponds to a logic high period of the control signal CTR1. The amplified mode circuit 130 is disabled for the second time period t2, which is a logic low period of the control signal CTR1. That is, the switches SW2 and SW3 are turned on for the first time period t1 and turned off for the second time period t2 in response to the control signal CTR1. When the amplified mode circuit 130 is enabled, a DC element of the filtered RF signal RF_f, which is the output signal of the filter circuit 110, is removed primarily through the capacitor C2. The RF signal RF_f whose DC element is removed is then amplified by the amplifier 131. After the DC element of the RF signal RF_f is further removed secondarily through the capacitor C3, the RF signal RF_f is output as the second RF signal RF2.

The passive mode circuit 120 and the amplified mode circuit 130 are enabled alternately and repeatedly. For example, the passive mode circuit 120 and the amplified mode circuit 130 are alternately enabled for the second time period t2 and the first time period t1, respectively. Power consumption of the amplified mode circuit 130 is greater than that of the passive mode circuit 120 due to the amplification operation. Accordingly, the RF detector 100 sets the time during which the amplified mode circuit 130 is enabled (e.g., the first time period t1) to be shorter than the time during which the passive mode circuit 120 is enabled (e.g., the second time period t2). By doing so, the power consumed by the amplified mode circuit 130 is limited to a small amount. According to exemplary embodiments, the times during which the mode circuits 120 and 130 are set to be enabled as described above results in preventing the power consumption from significantly increasing due to the operation of the amplified mode circuit 130, while allowing an RF signal to be detected over a longer distance.

Figure 4A:
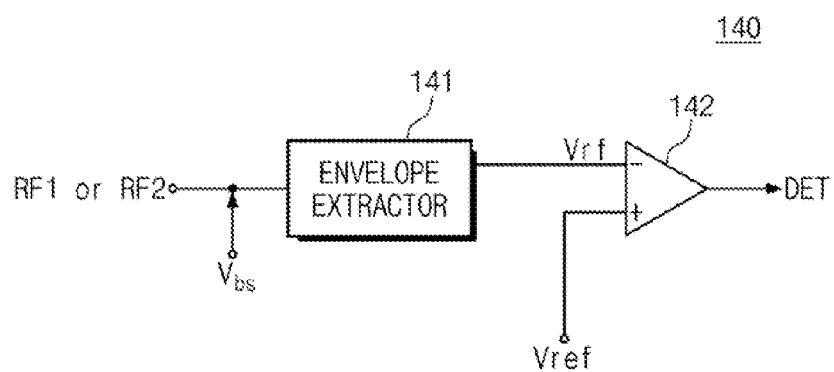
FIG. 4A is a circuit diagram illustrating an exemplary embodiment of the RF detecting circuit in FIG. 1.

FIG. 4A is a circuit diagram illustrating an exemplary embodiment of the RF detecting circuit 140 in FIG. 1. As illustrated, in an exemplary embodiment, the RF detecting circuit 140 includes an envelope extractor 141 and a comparator 142. The RF detecting circuit 140 compares an envelope voltage Vrf generated by detecting an envelope of the first RF signal RF1 or the second RF signal RF2 with a reference voltage Vref to output the detection signal DET.

The envelope extractor 141 extracts the envelope of the first RF signal RF1 or the second RF signal RF2 to output the envelope voltage Vrf. In exemplary embodiments, the envelope extractor 141 may include, for example, a diode, a capacitor, and a current source. Alternatively, in exemplary embodiments, the envelope extractor 141 may include, for example, a diode, a capacitor, and a resistor.

A DC bias voltage Vbs may be applied to the first RF signal RF1 or the second RF signal RF2 input to the envelope extractor 141. A voltage level of the DC bias voltage Vbs may be adjusted by an NFC controller 400 (see FIG. 5).

The comparator 142 receives the envelope voltage Vrf and the reference voltage Vref and compares their voltage levels to output the detection signal DET. For example, in an exemplary embodiment, when a difference between voltage levels of the envelope voltage Vrf and the reference voltage Vref is greater than or equal to a fixed value, the comparator 142 outputs a logic-high detection signal DET, which indicates that the RF signal RF exists. Alternatively, when the difference between the voltage levels of the envelope voltage Vrf and the reference voltage Vref is less than the fixed value, the comparator 142 outputs a logic-low detection signal DET, which indicates that the RF signal RF does not exist.

The RF detecting circuit 140 described with reference to FIG. 4A detects the envelope voltage Vrf of the first RF signal RF1 or the second RF signal RF2 and compares the envelope voltage Vrf with the reference voltage Vref to detect whether the RF signal RF exists.

Figure 4B:
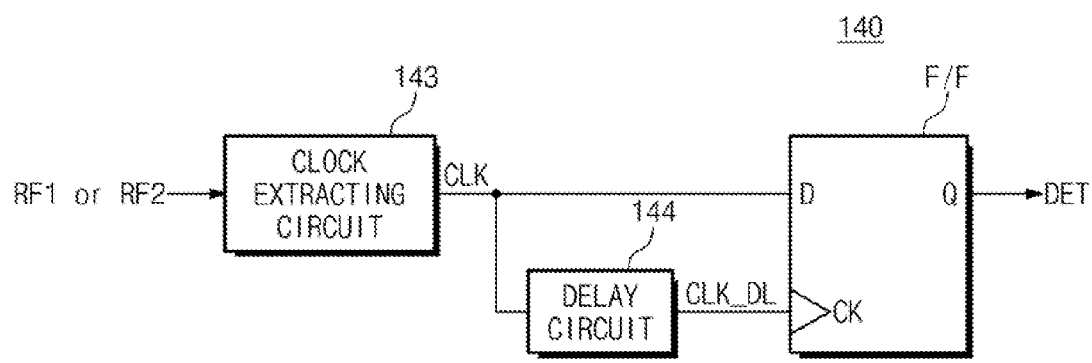
FIG. 4B is a circuit diagram illustrating an exemplary embodiment of the RF detecting circuit in FIG. 1.
Figure 4B:
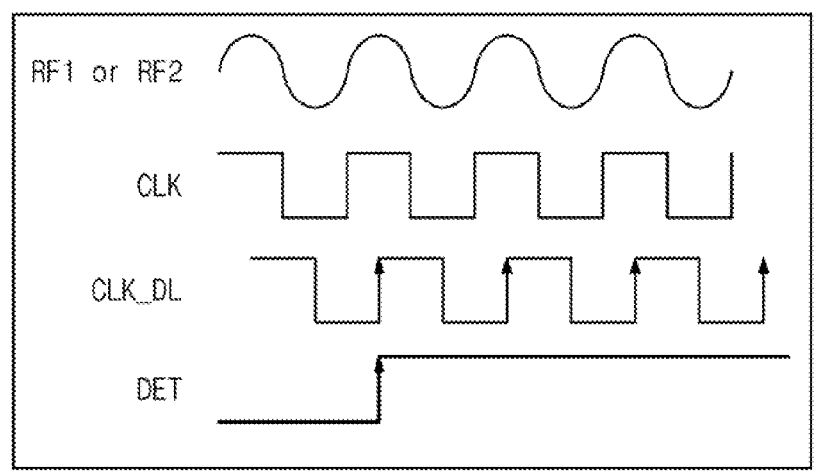

FIG. 4B is a circuit diagram illustrating an exemplary embodiment of the RF detecting circuit 140 in FIG. 1. As illustrated, in an exemplary embodiment, the detecting circuit 140 includes a clock extracting circuit 143, a clock delay circuit 144, and a D flip-flop F/F. The RF detecting circuit 140 may detect a clock signal CLK of a first. RF signal RF1 or a second RF signal RF2 to output a detection signal DET corresponding to whether an RF signal exists. Exemplary waveforms of signals of the RF detection circuit 140 in FIG. 4 are shown in the box below the RF detecting circuit 140 in FIG. 4B.

The clock extracting circuit 143 extracts the clock signal CLK of the first RF signal RF1 or the second RF signal RF2. The clock signal CLK is an analog signal. For example, the clock extracting circuit 143 may include an analog-to-digital converter (ADC). However, the configuration of the clock extracting circuit 143 is not limited thereto. For example, according to exemplary embodiments, the clock extracting circuit 143 may include another component(s) to extract a clock from an analog signal.

The clock delay circuit 144 delays the clock signal CLK extracted by the clock extracting circuit 143 by a predetermined time to output a delay clock signal CLK_DL. The clock delay circuit 144 may be implemented with a plurality of buffers, however, the clock delay circuit 144 is not limited thereto.

The D flip-flop F/F receives the clock signal CLK as a data input and receives the delay clock signal CLK_DL as a clock input to output the detection signal DET corresponding to a logic level of the clock signal CLK at each rising edge of the delay clock signal CLK_DL. For example, when the logic level of the clock signal CLK is high at the rising edge of the delay clock signal CLK_DL, the D flip-flop F/F outputs a logic-high detection signal DET to the next rising edge of the delay clock signal CLK_DL.

Referring to the box below the RF detecting circuit 140 in FIG. 4B, when the first RF signal RF1 or the second RF signal RF2 exists, the RF detecting circuit 140 may output a logic-high detection signal DET. Alternatively, when the first RF signal RF1 or the second RF signal RF2 does not exist, the RF detecting circuit 140 may output a logic-low detection signal DET.

Figure 4C:
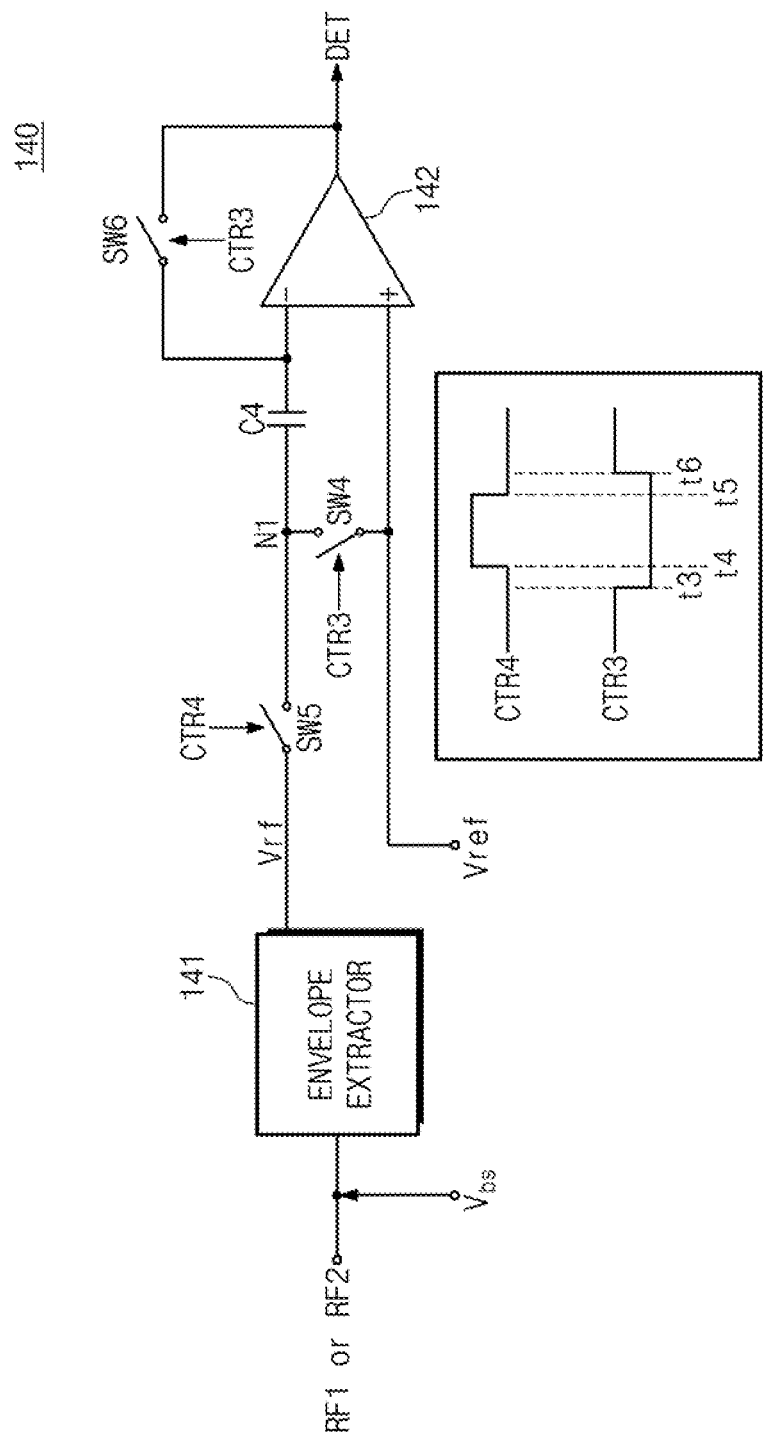
FIG. 4C is a circuit diagram illustrating an exemplary embodiment of the RF detecting circuit in FIG. 1.

FIG. 4C is a circuit diagram illustrating an exemplary embodiment of the RF detecting circuit 140 in FIG. 1. As illustrated, the RF detecting circuit 140 includes an envelope extractor 141, switches SW4, SW5, and SW6, a capacitor C4, and a comparator 142. The envelope extractor 141 extracts an envelope of the first RF signal RF1 or the second RF signal RF2 to output an envelope voltage Vrf. At this point, as DC bias voltage Vbs may be applied to the first RF signal RF1 or the second RF signal RF2 input to the envelope extractor 141. The level of the DC bias voltage Vbs may be adjusted by an NFC controller 400 (see FIG. 5). The configuration and operation characteristics of the envelope extractor 141 in FIG. 4C are identical to those of the envelope extractor 141 in FIG. 4A, and thus, for convenience of explanation, a further description thereof may be omitted herein.

The operation of the RF detecting circuit 140 in FIG. 4C will be described with reference to control signals CTR3 and CTR4 in the box below the RF detecting circuit 140 in FIG. 4C.

In an exemplary embodiment, when the first RF signal RF1 or the second RF signal RF2 does not exist (e.g., when a voltage level of a signal is zero), voltage levels of the envelope voltage Vrf and a reference voltage Vref are equal to each other, or have a value within a fixed level (e.g., within a threshold voltage of the comparator 142). Alternatively, when the first RF signal RF1 or the second RF signal RF2 exists (e.g., when a signal has a predetermined voltage level), the level of the envelope voltage Vrf is different from that of the reference voltage Vref due to the effect of the first RF signal RF1 or the second RF signal RF2.

Before time t3, a control signal CTR3 is logic high and a control signal CTR4 is logic low. Accordingly, the switch SW5 is turned off and the switches SW4 and SW6 are turned on. Thus, opposite ends of the capacitor C4 are charged with the charge amount corresponding to the reference voltage Vref.

At time t3, only the control signal CTR3 changes into a logic low state to turn off the switches SW4 and SW6. Accordingly, both ends of the capacitor C4 are opened, and thus, the capacitor C4 maintains the charge amount charged.

At time t4, a control signal CTR4 changes to a logic high state to apply the envelope voltage Vrf to a node N1. When the envelope voltage Vrf and the reference voltage Vref have different voltage levels, the amount of charges stored in the capacitor C4 may vary. Alternatively, when the envelope voltage Vrf has the same level as the reference voltage Vref, the amount of the charges stored in the capacitor C4 does not vary. That is, the charge amount of the capacitor C4 may vary depending on a difference between the levels of the envelope voltage Vrf and the reference voltage Vref at an interval between times t4 and t5.

At the time t5, the control signal CTR4 changes to a logic low state to turn off the switch SW5. The comparator 142 detects a voltage variation depending on the variation in the charge amount of the capacitor C4 from the time t4 to the time t5 in the interval between times t5 and t6 to output a detection signal DET. For example, when the charge amount of the capacitor C4 varies, and thus, the level of a voltage applied to an inverting terminal of the comparator 142 varies, the comparator 142 may output a logic-high detection signal DET. The logic-high detection signal DET indicates that the first RF signal RF1 or the second RF signal RF2 exists. Alternatively, when the charge amount of the capacitor C4 does not vary, and thus, the level of the voltage applied to the inverting terminal of the comparator 142 does not vary, the comparator 142 may output a logic-low detection signal DET. The logic-low detection signal DET indicates that that the first RF signal RF1 or the second RF signal RF2 does not exist.

At the time t6, the control signal CTR3 changes to a logic high state to turn on the switches SW4 and SW6, and thus, the opposite ends of the capacitor C4 are charged with the charge amount corresponding to the reference voltage Vref. The voltage level of the other end of the capacitor C4 (e.g., the voltage level of the inverting terminal of the comparator 142) is output as the detection signal DET.

As described above, depending on whether an RF signal exists, the RF detecting circuit 140 in FIG. 4C detects the variation in the amount of charges charging a capacitor to output the detection signal DET.

Figure 5:
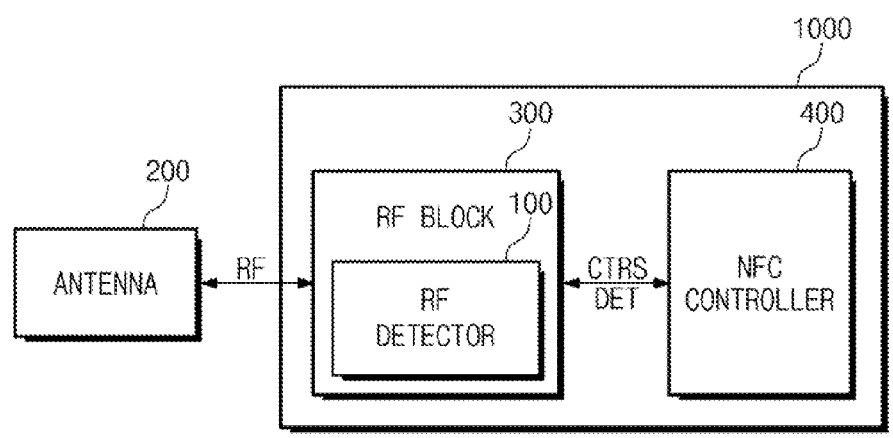
FIG. 5 is a block diagram of an NFC module including an RF detector according to exemplary embodiments of the inventive concept.

FIG. 5 is a block diagram of an NFC module 1000 including an RF detector 100 according to exemplary embodiments of the inventive concept. As illustrated, in exemplary embodiments, the RF detector 100 is implemented in an RF block 300 of the NFC module 1000. The NFC module 1000 includes the RF block 300 and an NFC controller 400.

The RF block 300 may include a transceiver for communication with an external device. In addition, the RF block 300 may include an RF detector 100 according to the exemplary embodiments of the inventive concept described herein.

The RF detector 100 may receive an RF signal RF from an antenna 200 to transmit a detection signal DET, which indicates whether the RF signal RF exists, to the NFC controller 400. The RF detector 100 includes a passive mode circuit 120 (see FIG. 1) enabled for a set first time and an amplified mode circuit 130 (see FIG. 1) enabled for a set second time. Since the amplified mode circuit 130 amplifies and outputs an input RF signal RF, the RF detector 100 may detect even an RF signal RF having a low intensity. That is, according to exemplary embodiments, the detection distance of the RF detector 100 may increase.

As described above, according to exemplary embodiments, the time during which the passive mode circuit 120 is enabled is set to be shorter than the time during which the amplified mode circuit 130 is enabled. Accordingly, detection distance may increase while not resulting in a significant increase in power consumption, as compared to an RF detector including only the passive mode circuit 120.

The NFC controller 400 may control the overall operation of the NFC module 1000. For example, the NFC controller 400 activates an NFC card mode or an NFC reader mode of the NFC module 1000. The NFC controller 400 may generate and transmit various control signals CTRs of the RF detector 100. The NFC controller 400 may receive a detection signal DET and activate the NFC card mode in response to the detection signal DET. When the NFC card mode is activated, a communication device including the NFC module 1000 may communicate with an external device such as, for example, an NFC reader.

According to exemplary embodiments, the NFC module 1000 may include, for example, a hardware block(s) and/or a software block(s) used for the operation of a memory, a clock generator, a voltage generator, etc.

Figure 6:
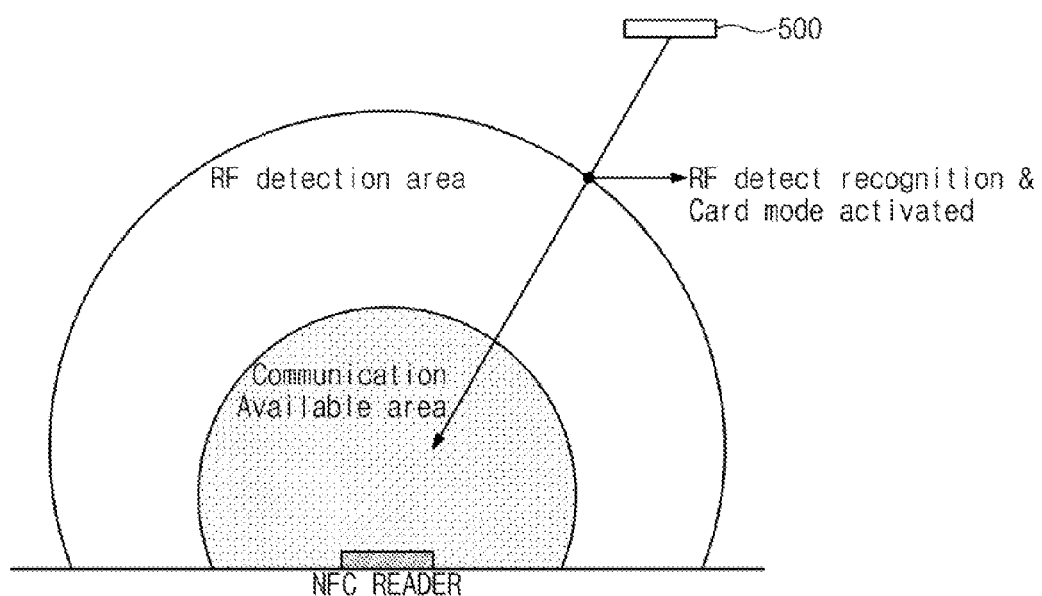
FIG. 6 illustrates an NFC card mode activation operation depending on a detection signal of an RF detector according to exemplary embodiments of the inventive concept.

FIG. 6 illustrates an NFC card mode activation operation depending on a detection signal of an RF detector according to exemplary embodiments of the inventive concept. More specifically, FIG. 6 illustrates that in an exemplary embodiment, an NFC card mode is activated at substantially a same time as a detection operation of an RF signal when the RF signal is detected during an amplify mode activation period.

A radio-frequency (RF) communication device 500 includes the NFC module 1000 shown in FIG. 5. As described with reference to FIG. 5, the RF block 300 of the NFC module 1000 includes an RF detector 100 according to the exemplary embodiments of the inventive concept described herein.

When the passive mode circuit 120 of the RF detector 100 is enabled, the range capable of detecting an RF signal through the passive mode circuit 120 is shown as a communication available area in FIG. 6. When the amplified mode circuit 130 of the RF detector 100 is enabled, the range capable of detecting an RF signal through the amplified mode circuit 130 is shown as an RF detection area in FIG. 6. As shown in FIG. 6, when the amplified mode circuit 130 is enabled, an RF signal may be detected at a longer distance.

When an RF signal is detected through the amplified mode circuit 130, this means that a communication device functioning as an NFC reader exists at a relatively short distance. Accordingly, the RF communication device 500 activates an NFC card mode to perform NFC communication with the communication device functioning as the NFC reader. It is likely that when an RF signal is detected through the amplified mode circuit 130, the RF communication device 500 performs communication with the NFC reader. Thus, with the expectation that communication is performed, the RF communication device 500 may activate the NFC card mode of the RF communication device 500 in advance to perform high-speed communication with the NFC reader.

Figure 7:
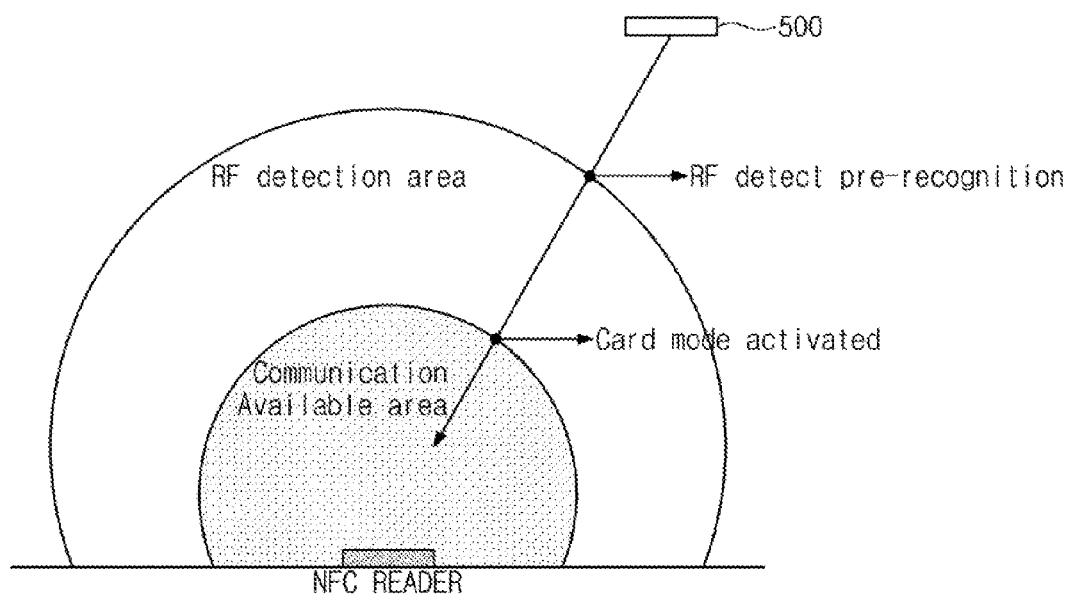
FIG. 7 illustrates an NFC card mode activation operation depending on a detection signal of an RF detector according to exemplary embodiments of the inventive concept.

FIG. 7 illustrates an NFC card mode activation operation depending on a detection signal of an RF detector according to exemplary embodiments of the inventive concept. More specifically, FIG. 7 illustrates that in an exemplary embodiment, an NFC card mode is enabled after a lapse of a predetermined time when an RF signal is detected during an amplify mode activation period.

A radio-frequency (RF) communication device 500 includes the NFC module 1000 shown in FIG. 5. As described with reference to FIG. 5, the RF block 300 of the NFC module 1000 includes an RF detector 100 according to the exemplary embodiments of the inventive concept described herein.

When the passive mode circuit 120 of the RF detector 100 is enabled, the range capable of detecting an RF signal through the passive mode circuit 120 is shown as a communication available area in FIG. 6. When the amplified mode circuit 130 of the RF detector 100 is enabled, the range capable of detecting an RF signal through the amplified mode circuit 130 is shown as an RF detection area in FIG. 6. As shown in FIG. 6, when the amplified mode circuit 130 is enabled, an RF signal may be detected at a longer distance.

When an RF signal is detected through the amplified mode circuit 130, this means that a communication device functioning as an NFC reader exists at a relatively short distance. Accordingly, the RF communication device 500 activates an NFC card mode to perform NFC communication with the communication device functioning as the NFC reader. However, power consumption is high when the NFC card mode is activated. Unlike FIG. 6, the RF communication device 500 does not activate the NFC card mode in advance before reaching the communication available area with the NFC reader, but rather, activates the NFC card mode after the passage of a set/predetermined time has elapsed. The time set to activate the NFC card mode after detection of the RF signal may be variously set. For example, in an exemplary embodiment, the NFC card mode may be set to be activated after a predetermined amount of time has elapsed from the reception of the detection signal indicating that the RF signal has been detected (e.g., once the detection signal indicating that the RF signal has been detected has been received, the predetermined amount of time begins, and the NFC card mode is activated after the predetermined amount of time has elapsed). In an exemplary embodiment, the NFC card mode may be set to be activated after a predetermined count value by counting the enable number of the amplified mode circuit 130 (e.g., by counting the number of times that the amplified mode circuit 130 is enabled, and activating the NFC card mode upon the number of times that the amplified mode circuit 130 is enabled reaching a predefined count value). When the NFC card mode is activated as shown in FIG. 7, power consumption of the RF communication device 500 may be reduced compared to the RF communication device 500 in FIG. 6. Thus, the lifetime of power (e.g., battery life) may be extended.

According to exemplary embodiments of the inventive concept, method of operating the RF detector 100 includes outputting, by the passive mode circuit 120, RF signal RF as the first RF signal RF1 while the passive mode circuit 120 is enabled. As described above, the passive mode circuit 120 is enabled during a first time period. The method further includes amplifying, by the amplified mode circuit 130, RF signal RF while the amplified mode circuit 130 is enabled, and outputting, by the amplified mode circuit 130, the amplified RF signal RF as the second RF signal RF2 while the amplified mode circuit 130 is enabled. As described above, the amplified mode circuit 130 is enabled during a second time period, which is shorter than the first time period. The passive mode circuit 120 and the amplified mode circuit 130 are enabled alternately and repeatedly. The method may further include removing, by the passive mode circuit 420, a DC element of the RF signal RF before outputting the RF signal RF as the first RF signal RF1, and/or removing, by the amplified mode circuit 130, a DC element of the amplified RF signal RF before outputting the amplified RF signal RF as the second RF signal RF2.

Figure 8:
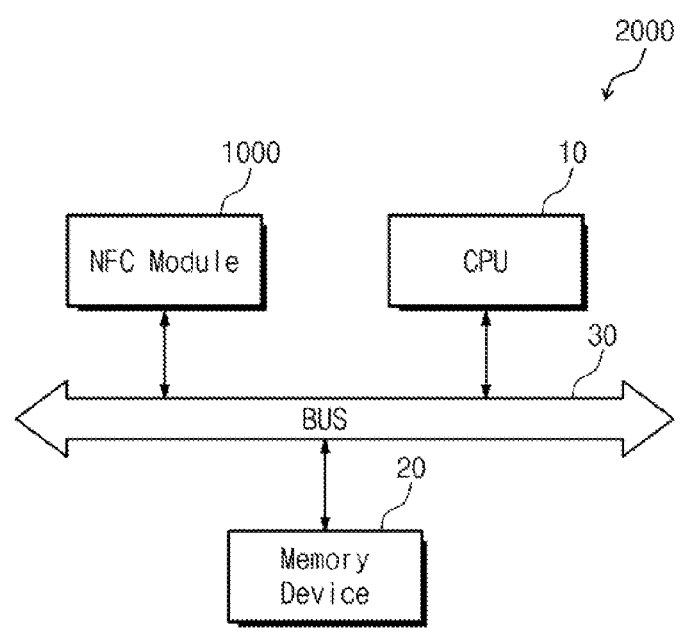
FIG. 8 is a block diagram of an electronic device to which the NFC module in FIG. 5 is applied according to exemplary embodiments of the inventive concept.

FIG. 8 is a block diagram of an electronic device 2000 to which the NFC module 1000 in FIG. 5 is applied according to an exemplary embodiment of the inventive concept. As illustrated, the electronic device 2000 according to an exemplary embodiment includes the NFC module 1000, a central processing unit (CPU) 10 connected to the NFC module 1000 through a bus 30, and a memory device 20 connected to the bus 30. Since the NFC module 1000 includes an RF detector 100 as described with reference to FIGS. 1 and 5, the electronic device 2000 may have a large detection distance while also minimizing/reducing its power consumption.

The bus 30 may perform communication through at least one of various interface protocols such as, for example, Universal Serial Bus (USB) protocol, multimedia card (MMC) protocol, peripheral component interconnection (PCI) protocol, PCI-express (PCI-E) protocol, Advanced Technology Attachment (ATA) protocol, Serial-ATA protocol, Parallel-ATA protocol, small computer small interface (SCSI) protocol, enhanced small disk interface (ESDI) protocol, and Integrated Drive Electronics (IDE) protocol.

The memory device 20 may store data received from the NFC module 1000 according to the control of the CPU 10.

The memory device 20 may be implemented with a nonvolatile memory device. The nonvolatile memory device may include various types of nonvolatile memory cells.

Each of the nonvolatile memory cells may be a cell of, for example, an electrically erasable programmable read-only memory (EEPROM), a flash memory, a magnetic RAM (MRAM), a spin-transfer torque MRAM (STT-MRAM), a conductive bridging RAM (CBRAM), a ferroelectric RAM (FRAM), a phase change RAM (PRAM) called an ovonic unified memory (OUM), a resistive RAM (RRAM or ReRAM), nanotube RRAM, a nanotube RRAM, a polymer RAM (PoRAM), a nano floating gate memory (NFGM), holographic memory, a molecular electronics memory device or an insulator resistance change memory.

The electronic device 2000 in FIG. 8 may be provided as one of various components such as, for example, a computer, an ultra-mobile personal computer (UMPC), a workstation, a net-book, a personal digital assistant (PDA), a portable computer, a web table, a table computer, a wireless phone, a smartphone, an e-book, a portable multimedia player (PMP), a handheld game console, a navigation system, a black box, a digital camera, a digital multimedia broadcasting (DMB) player, a three-dimensional television (3D TV), a digital audio recorder, a digital audio player, a digital picture player, a digital video recorder, a digital video player, a storage constituting a data center, a device for transmitting and receiving information in a wireless environment, one of various electronic devices constituting a home network, one of various electronic devices constituting a computer network, one of various electronic devices constituting a telematics network, a radio frequency identification (RFID) device, and one of various components constituting a computing system.

Figure 9:
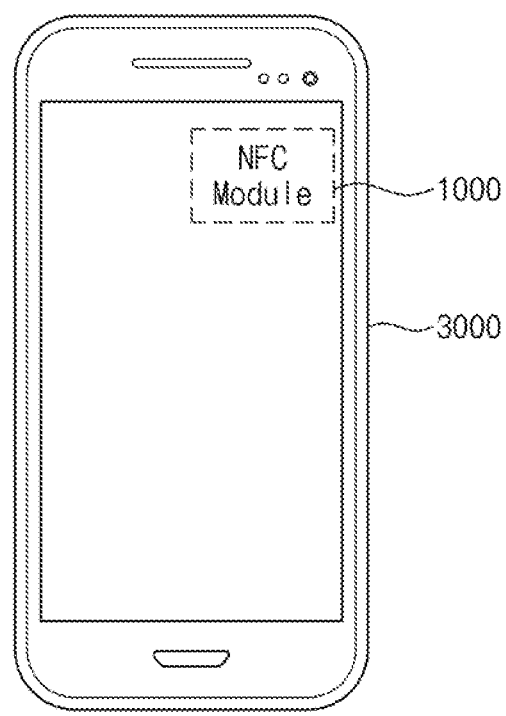
FIG. 9 illustrates a portable terminal on which the NFC module in FIG. 5 is mounted according to an exemplary embodiment of the inventive concept.

FIG. 9 illustrates a portable terminal 3000 on which the NFC module 1000 in FIG. 5 is mounted according to an exemplary embodiment of the inventive concept. Due to the mounted NFC module 1000, the portable terminal 3000 may function as an NFC reader or an NFC card. The NFC module 1000 may include the RF detector 100 shown in FIG. 1. Thus, the NFC circuit 1000 may have large detection distance while also minimizing/reducing its power consumption.

As described above, in exemplary embodiments, an RF signal is detected by repeatedly activating an amplify mode in which the RF signal is amplified for a set period of time. Thus, an RF signal at a large distance may be detected while minimizing/reducing power consumption. Moreover, in exemplary embodiments, only an RF signal of a set frequency may be selectively detected through a filter circuit.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A radio-frequency (RF) communication device having a near field communication (NFC) function, the RF communication device comprising:
   a first detection mode circuit configured to output an RF input signal received by an antenna as a first RF signal while the first detection mode circuit is enabled, wherein the first detection mode circuit is enabled during a first time period; and
   a second detection mode circuit configured to amplify the RF input signal and output the amplified RF input signal as a second RF signal while the second detection mode circuit is enabled, wherein the second detection mode circuit is enabled during a second time period, and the second time period is shorter than the first time period,
   wherein the first and second detection mode circuits are enabled alternately and repeatedly.

2. The RF communication device of claim 1, wherein the first detection mode circuit comprises:
   a switch turned on or turned off in response to a control signal; and
   a capacitor connected to one end of the switch, wherein the capacitor is configured to remove a direct current (DC) element of the RF input signal and output the RF input signal having the removed DC element as the first RF signal.

3. The RF communication device of claim 1, wherein the second detection mode circuit comprises:
   a switch turned on or turned off in response to a control signal;
   an amplifier connected to the switch and configured to amplify the RF input signal; and
   a capacitor connected to the amplifier, wherein the capacitor is configured to remove a direct current (DC) element of the amplified RF input signal and output the amplified RF input signal having the removed DC element as the second RF signal.

4. The RF communication device of claim 1, further comprising:
   a filter circuit configured to pass the RF input signal received by the antenna to the first detection mode circuit and the second detection mode circuit only when the RF input signal has a set frequency.

5. The RF communication device of claim 4, wherein the set frequency is about 13.56 MHz.

6. The RF communication device of claim 1, further comprising:
   an RF detecting circuit configured to receive the first RF signal or the second RF signal,
   wherein the RF detecting circuit detects a voltage level, a voltage variation or a clock signal of the first RF signal or the second RF signal, and outputs a detection signal indicating whether the RF input signal has been detected based on the detected voltage level, the detected voltage variation or the detected clock signal.

7. The RF communication device of claim 6, wherein the RF detecting circuit detects a voltage level envelope of the first RF signal or the second RF outputs an envelope voltage based on the detected voltage level envelope, compares the outputted envelope voltage with a reference voltage, and outputs the detection signal based on comparing the outputted envelope voltage with the reference voltage.

8. The RF communication device of claim 6, wherein the RF detecting circuit comprises a capacitor, the first RF signal or the second RF signal is applied to one end of the capacitor, and the outputted detection signal is based on a charge variation of the capacitor.

9. The RF communication device of claim 6, wherein the RF detecting circuit comprises:
a clock extracting circuit that extracts the clock signal of the first RF signal or the second RF signal;
a clock delay circuit that delays the extracted clock signal of the first RF signal or the second RF signal by a predetermined time; and
a D flip-flop that receives the extracted clock signal of the first RF signal or the second RF signal at a data input, receives the delayed clock signal at a clock input, and outputs the detection signal.

10. The RF communication device of claim 1, further comprising:
an NFC circuit comprising an NFC controller,
wherein the NFC controller is configured to control the NFC circuit to activate an NFC card mode in response to the detection signal.

11. The RF communication device of claim 10, wherein the NFC controller activates the NFC card mode in response to the detection signal indicating that the RF input signal has been detected.

12. The RF communication device of claim 10, wherein the NFC controller activates the NFC card mode in response to the detection signal indicating that the RF input signal has been detected and after a predetermined time has elapsed.

13. A radio-frequency (RF) communication device, comprising:
a passive mode circuit configured to receive an RF signal from an external near field communication (NFC) reader, and output the received RF signal as a first RF signal while the passive mode circuit is enabled, wherein the passive mode circuit is enabled during a first time period;
an amplified mode circuit configured to receive the RF signal from the external NFC reader, amplify the RF signal, and output the amplified RF signal as a second RF signal while the amplified mode circuit is enabled, wherein the amplified mode circuit is enabled during a second time period, and the second time period is shorter than the first time period; and
an RF detecting circuit configured to receive the first RF signal or the second RF signal, detect a voltage level, a voltage variation or a clock signal of the first RF signal or the second RF signal, and output a detection signal indicating whether the RF signal has been detected based on the detected voltage level, the detected voltage variation or the detected clock signal,
wherein the passive mode circuit and the amplified mode circuit are alternately activated.

14. The RF communication device of claim 13, further comprising:
an NFC controller configured to receive the detection signal and activate an NFC card mode of the RF communication device,
wherein the NFC controller activates the NFC card mode at substantially a same time as the detection signal indicating that the RF signal has been detected is received.

15. The RF communication device of claim 13, further comprising:
an NFC controller configured to receive the detection signal and activate an NFC card mode of the RF communication device,
wherein the NFC controller activates the NFC card mode after a predetermined time has elapsed from reception of the detection signal indicating that the RF signal has been detected is received.

16. A method of operating a radio-frequency (RF) communication device, comprising:
outputting, by a first detection mode circuit, an RF input signal received by an antenna as a first RF signal while the first detection mode circuit is enabled, wherein the first detection mode circuit is enabled during a first time period;
amplifying, by a second detection mode circuit, the RF input signal while the second detection mode circuit is enabled;
outputting, by the second detection mode circuit, the amplified RF input signal as a second RF signal while the second detection mode circuit is enabled, wherein the second detection mode circuit is enabled during a second time period, and the second time period is shorter than the first time period,
wherein the first and second detection mode circuits are enabled alternately and repeatedly.

17. The method of claim 16, wherein the RF input signal is received by the antenna via near field communication (NFC).

18. The method of claim 16, further comprising:
removing, by the first detection mode circuit, a direct current (DC) element of the RF input signal before outputting the RF input signal as the first RF signal.

19. The method of claim 16, further comprising:
removing, by the second detection mode circuit, a direct current (DC) element of the amplified RF input signal before outputting the amplified RF input signal as the second RF signal.

20. The method of claim 16, wherein the RF input signal received by the antenna is passed to the first detection mode circuit and the second detection mode circuit only when the RF input signal has a set frequency.

* * * * *